United States Patent
Kakizaki et al.

(10) Patent No.: US 6,654,402 B1
(45) Date of Patent: Nov. 25, 2003

(54) CORONA PREIONIZATION ELECTRODE UNIT FOR USE IN GAS LASER APPARATUS

(75) Inventors: Koji Kakizaki, Gotenba (JP); Kazuaki Hotta, Gotenba (JP); Motohiro Arai, Gotenba (JP)

(73) Assignee: Ushio Denki Kabushiki Kaisya, Tokyo (JP)

(*) Notice: Subject to any disclaimer, the term of this patent is extended or adjusted under 35 U.S.C. 154(b) by 167 days.

(21) Appl. No.: 09/626,417

(22) Filed: Jul. 26, 2000

(30) Foreign Application Priority Data

Aug. 4, 1999 (JP) ............................................ 11-220800

(51) Int. Cl.[7] ...................... H01S 3/097; H01S 3/0977; H01S 3/022; H01S 3/0225
(52) U.S. Cl. ............................. 372/86; 372/55; 372/87
(58) Field of Search ............................... 372/55, 86, 87

(56) References Cited

U.S. PATENT DOCUMENTS

| | | | | |
|---|---|---|---|---|
| 4,718,072 A | * | 1/1988 | Marchetti et al. ............. | 372/86 |
| 5,251,226 A | * | 10/1993 | Watanabe et al. ............. | 372/87 |
| 5,313,487 A | * | 5/1994 | Fujikawa et al. ............. | 372/86 |
| 5,337,330 A | | 8/1994 | Larson | |
| 5,719,896 A | * | 2/1998 | Watson ........................ | 372/86 |
| 5,875,207 A | * | 2/1999 | Osmanow .................... | 372/86 |
| 6,414,978 B2 | * | 7/2002 | Bragin et al. ................. | 372/58 |
| 6,456,643 B1 | * | 9/2002 | Osmanow et al. ............ | 372/86 |

FOREIGN PATENT DOCUMENTS

| | | |
|---|---|---|
| JP | 63-227074 | 9/1988 |
| JP | 1-276783 | 11/1989 |
| JP | 10-242553 | 11/1998 |

OTHER PUBLICATIONS

Sato Y. et al, "Development of a 2–kW XeCl Laser with a Surface Corona Preionization Scheme and a Spiker–Sustainer Circuit", IEEE Journal of Selected Topics in Quantum Electronics, vol. 1, No. 3, Sep. 1995.*

J.D. Cobine, "Gaseous Conductors—Theory and Engineering Applications", McGraw–Hill Book Company, Inc. New York 1941, p. 161.*

* cited by examiner

Primary Examiner—Nathan J. Flynn
Assistant Examiner—Johannes Mondt
(74) Attorney, Agent, or Firm—Dellett and Walters

(57) ABSTRACT

A corona preionization electrode unit for use in gas laser apparatus, wherein the electric field for corona discharge is concentrated, and ultraviolet radiation is not blocked, and further the laser gas stream is not obstructed, thereby allowing efficient, stable and uniform corona preionization. The corona preionization electrode unit is disposed in a gas laser apparatus together with a pair of main discharge electrodes for ionizing and exciting a laser gas. The corona preionization electrode unit includes a first electrode covered with a dielectric material and a second electrode placed in contact with the outer surface of the dielectric material around the first electrode. The corona preionization electrode unit is positioned in the vicinity of either one of the main discharge electrodes. The second electrode is a plate-shaped member having a straight edge contacting at least the outer surface of the dielectric material. A portion of the plate-shaped member other than the edge is provided with a plurality of openings for passage of ultraviolet light for preionization and a circulating laser gas.

10 Claims, 5 Drawing Sheets

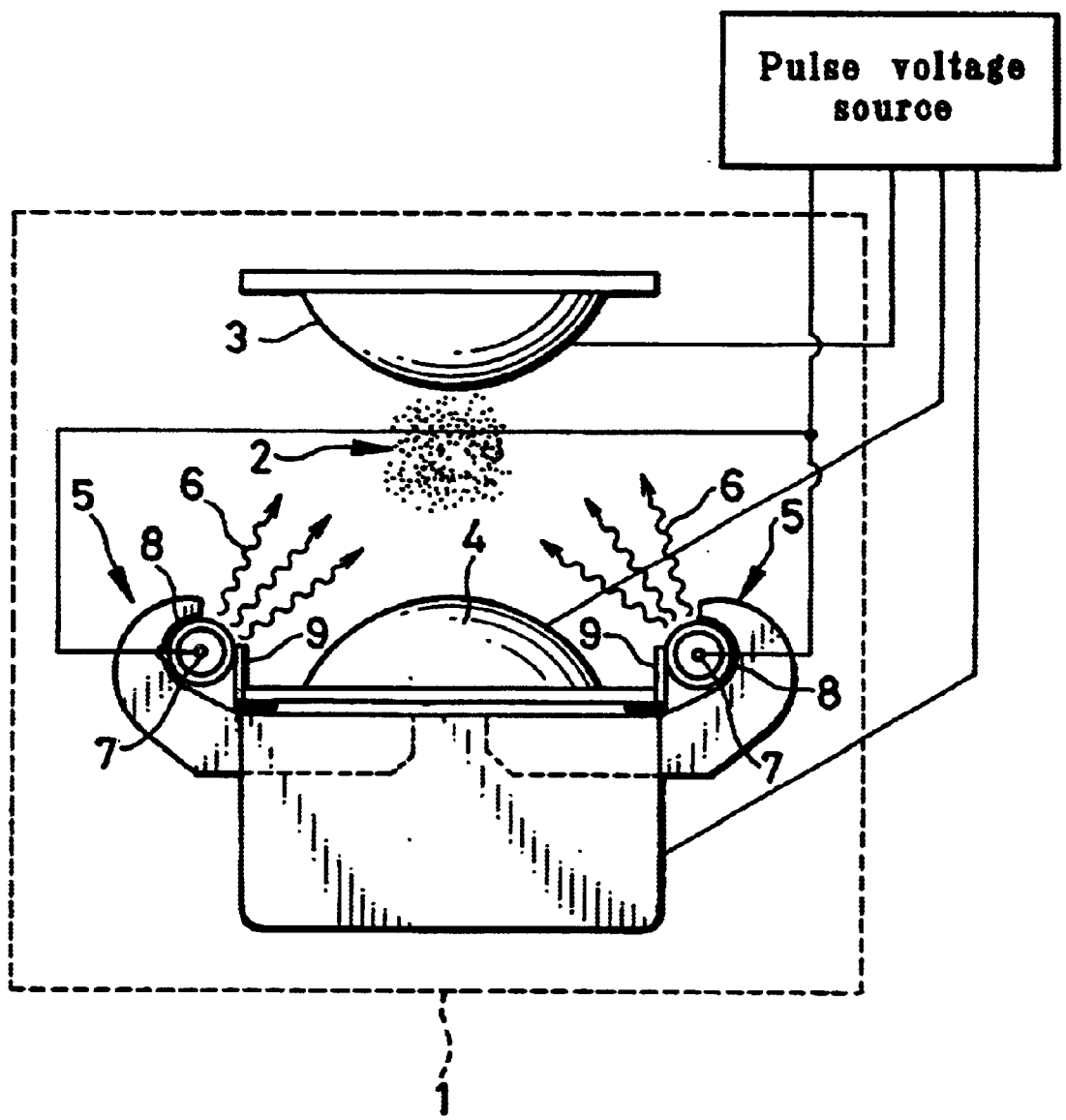

CORONA PREIONIZATION ELECTRODE UNIT FOR USE IN GAS LASER APPARATUS

BACKGROUND OF THE INVENTION

The present invention relates to a corona preionization electrode unit for use in gas laser apparatus, e.g. excimer lasers. More particularly, the present invention relates to a corona preionization electrode unit for gas laser apparatus which is capable of generating efficient, stable and uniform corona preionization.

Gas laser apparatus, e.g. excimer lasers, have corona preionization electrodes for irradiating a laser gas with ultraviolet radiation to weakly ionize the laser gas in advance of ionization by the main electric discharge, besides main discharge electrodes for ionizing and exciting the laser gas [for example, see Published Japanese Translation of PCT International Publication No. 8-502145 and Japanese Patent Application Unexamined Publication (KOKAI) No. 10-242553].

There is known a corona preionization electrode structure in which one electrode is axially disposed in a hollow dielectric material and the other electrode, which is a wire-shaped electrode, is wound around the dielectric material to generate a corona discharge, thereby uniformly preionizing the laser gas in the discharge space between the main discharge electrodes [Japanese Patent Application Unexamined Publication (KOKAI) No. 63-227074].

In recent years, however, it has been strongly demanded that excimer laser apparatus for semiconductor exposure and so forth perform a high repetition rate oscillating operation (i.e. it has been demanded that the pulse repetition frequency be increased from 1 kHz, which is the conventional level, to 2 to 3 kHz). Under these circumstances, the above-described electrode structure in which a wire-shaped electrode is wound around a hollow dielectric material suffers from the problem that the wire-shaped electrode undesirably vibrates at such a high pulse repetition frequency.

Meanwhile, a corona preionization electrode structure in which a plate-shaped electrode is placed in contact with a dielectric material is known [Published Japanese Translation of PCT International Publication No. 8-502145]. The known corona preionization electrode structure is shown schematically in FIG. 7.

FIG. 7 is a sectional view in a direction perpendicular to the laser oscillation direction of an excimer laser apparatus. A laser cavity 1 is filled with a laser gas 2. Main discharge electrodes 3 and 4 for exciting the laser gas 2 are disposed to face each other in a direction perpendicular to the laser oscillation direction. The laser gas 2 is circulated by a fan (not shown) so as to form a gas stream between the opposed main discharge electrodes 3 and 4. Corona preionization electrode units 5 are disposed on the upstream and downstream sides, respectively, of the stream of laser gas 2 in parallel to one main discharge electrode 4. The corona preionization electrode units 5 perform a corona discharge operation immediately before the application of a pulse voltage between the main discharge electrodes 3 and 4 to generate a main electric discharge, thereby irradiating the laser gas 2 between the main discharge electrodes 3 and 4 with ultraviolet radiation 6 and thus weakly ionizing the laser gas 2 to promote excitation by the main discharge electrodes 3 and 4. The corona preionization electrode units 5 in Published Japanese Translation of PCT International Publication No. 8-502145 have a structure in which a first electrode 7 is provided to extend through a dielectric tube 8 made of alumina ceramics, and a second electrode 9 formed in a plate-like shape is placed in contact with the outer surface of the tube 8.

As stated above, it has recently been demanded that excimer laser apparatus perform a high repetition rate oscillating operation. It is necessary in order to attain a high repetition rate operation to increase the intensity of corona preionization, prevent the corona light emission intensity from being lowered by the high repetition rate operation and secure the corona preionization electrode structure so that it will not change even in a high-velocity gas stream (because it is necessary to increase the flow velocity of the laser gas in proportion to the pulse repetition frequency).

In the conventional corona preionization electrode structure shown in FIG. 7, the second electrode 9 is a plate-shaped electrode, and this gives rise to problems as stated below.

(1) Because the dielectric tube 8 and the second electrode 9 are in plane contact with each other, the field strength is weak. Therefore, the corona preionization intensity cannot always be increased. In addition, because of the plane contact, the condition of contact between the dielectric tube 8 and the second electrode 9 is not always satisfactory, and it is likely that the corona preionization intensity will become nonuniform.

(2) Light generated by corona discharge below the contact position of the plate-shaped second electrode 9 is blocked by the second electrode 9 and cannot be used for preionization of the laser gas 2 between the main discharge electrodes 3 and 4. Therefore, the preionization efficiency is unfavorably low.

(3) Because the second electrode 9 has a plate-like shape, the stream of laser gas 2 is obstructed by the plate-shaped electrode 9. Consequently, the laser gas 2 stagnates at the surface of the dielectric tube 8, resulting in a reduction in the intensity of light generated by corona discharge.

(4) Because of its plate-like shape, the second electrode 9 vibrates as it resists the stream of laser gas 2, causing the corona discharge to become unstable.

SUMMARY OF THE INVENTION

In view of the above-described problems with the prior art, an object of the present invention is to provide a corona preionization electrode unit for use in gas laser apparatus, e.g. excimer lasers, which includes a first electrode covered with a dielectric material and a second electrode different from the first electrode, wherein the electric field for corona discharge is concentrated, and light generated by corona discharge is not blocked, and further the laser gas stream is not obstructed, thereby allowing efficient, stable and uniform corona preionization.

To attain the above-described object, the present invention provides a corona preionization electrode unit for use in a gas laser apparatus. The corona preionization electrode unit is disposed in the gas laser apparatus together with a pair of main discharge electrodes for ionizing and exciting a laser gas. The corona preionization electrode unit includes a first electrode covered with a dielectric material and a second electrode placed in contact with the outer surface of the dielectric material around the first electrode. The corona preionization electrode unit is positioned in the vicinity of either one of the main discharge electrodes. The second electrode is a plate-shaped member having a straight edge contacting at least the outer surface of the dielectric material. A portion of the plate-shaped member other than the edge is provided with a plurality of openings for passage of ultraviolet light for preionization and a circulating laser gas.

In this case, it is desirable that the second electrode be in line contact with the outer surface of the dielectric material at the edge thereof, and that a surface of the plate-shaped member in the vicinity of the edge of the second electrode be at an angle to a plane tangent to the outer surface of the dielectric material at the position of the line contact.

In addition, it is desirable that the edge of the second electrode be inserted into a groove formed in the outer surface of the dielectric material to contact the dielectric material.

In addition, it is desirable that the edge of the second electrode contact the outer surface of the dielectric material at a position from which the space between the main discharge electrodes is visible.

In addition, it is desirable that the second electrode be bent or curved in the vicinity of the edge.

The second electrode may be in contact with a plurality of portions of the outer surface of the dielectric material at portions thereof in the vicinity of the edge.

It is desirable that the opening ratio of the openings in the second electrode be not less than 50%.

In the present invention, the second electrode is a plate-shaped member having a straight edge contacting at least the outer surface of the dielectric material around the first electrode, and a portion of the plate-shaped member other than the edge is provided with a plurality of openings for passage of ultraviolet light for preionization and a circulating laser gas. Therefore, the electric field for corona discharge is concentrated, and light generated by corona discharge is not blocked, and further the laser gas stream is not obstructed, thereby allowing efficient, stable and uniform corona preionization. Accordingly, even when the laser apparatus performs an oscillating operation at a high pulse repetition frequency, it is possible to effect preionization of high intensity and high uniformity and hence possible to improve the laser output characteristics to a considerable extent.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 7 is a sectional view of an electric discharge part of an excimer laser apparatus using an example of conventional corona preionization electrodes.

DESCRIPTION OF THE PREFERRED EMBODIMENTS

The corona preionization electrode unit for gas laser apparatus according to the present invention will be described below by way of embodiments.

Figure 1:
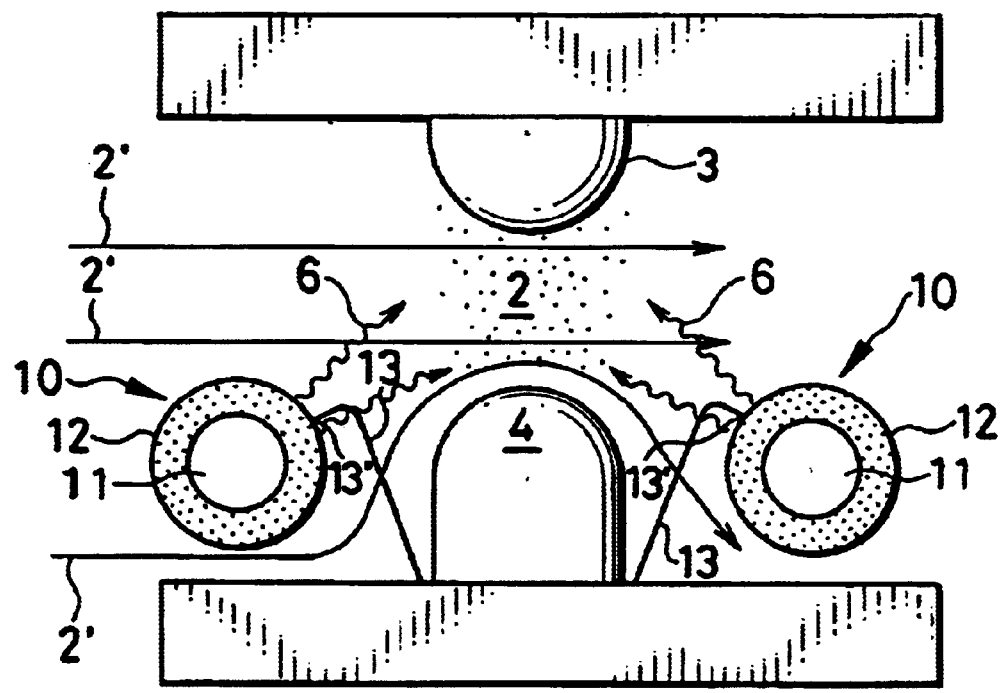
FIG. 1 is a sectional view in a direction perpendicular to the laser oscillation direction, showing an electric discharge part of an excimer laser apparatus using a corona preionization electrode unit according to an embodiment of the present invention.
Figure 2:
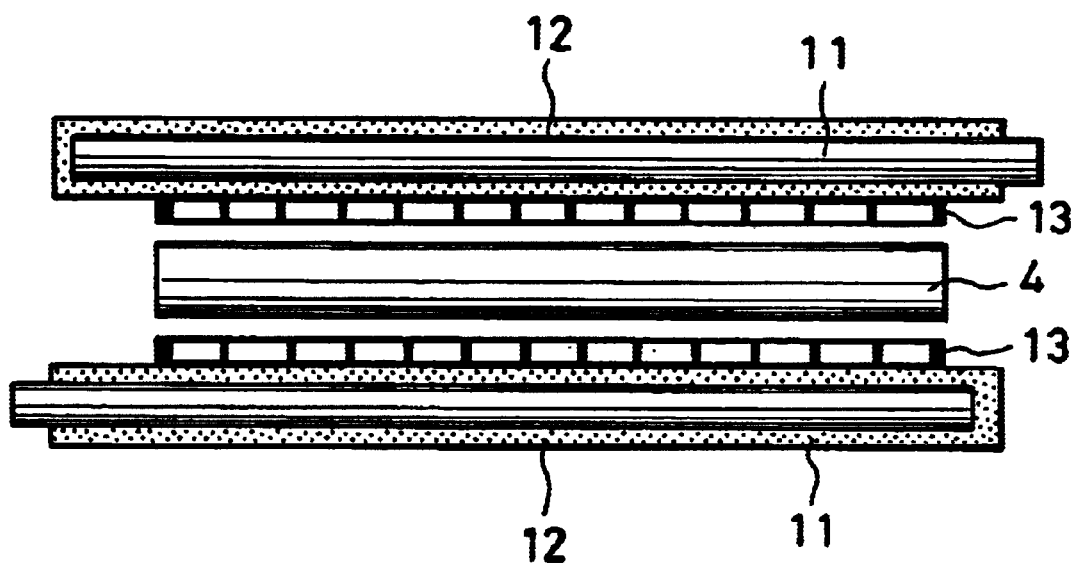
FIG. 2 a top plan view showing one main discharge electrode and corona preionization electrode units disposed parallel to it in the arrangement shown in FIG. 1.

FIG. 1 is a sectional view in a direction perpendicular to the laser oscillation direction of an excimer laser apparatus using a corona preionization electrode unit according to an embodiment of the present invention. FIG. 2 is a top plan view of one main discharge electrode and corona preionization electrode units disposed parallel to it in the arrangement shown in FIG. 1. It should be noted, however, that in FIG. 2 the first electrode of each corona preionization electrode unit is shown in a sectional view taken along a plane containing the axis of the first electrode.

A laser cavity shown in FIG. 1 is filled with a laser gas 2 (in the case of an ArF excimer laser, a mixed gas of Ar gas, $F_2$ gas and Ne gas). Main discharge electrodes 3 and 4 for exciting the laser gas 2 are disposed to face each other in a direction perpendicular to the laser oscillation direction. The laser gas 2 is circulated by a fan (not shown) so as to form a gas stream 2' between the opposed main discharge electrodes 3 and 4. Corona preionization electrode units 10 are disposed on the upstream and downstream sides, respectively, of the stream 2' of laser gas 2 in parallel to one main discharge electrode 4. The corona preionization electrode units 10 perform a corona discharge operation immediately before the application of a pulse voltage between the main discharge electrodes 3 and 4 to generate a main electric discharge, thereby irradiating the laser gas 2 between the main discharge electrodes 3 and 4 with ultraviolet radiation 6 and thus weakly ionizing the laser gas 2 to promote excitation by the main discharge electrodes 3 and 4.

Figure 3:
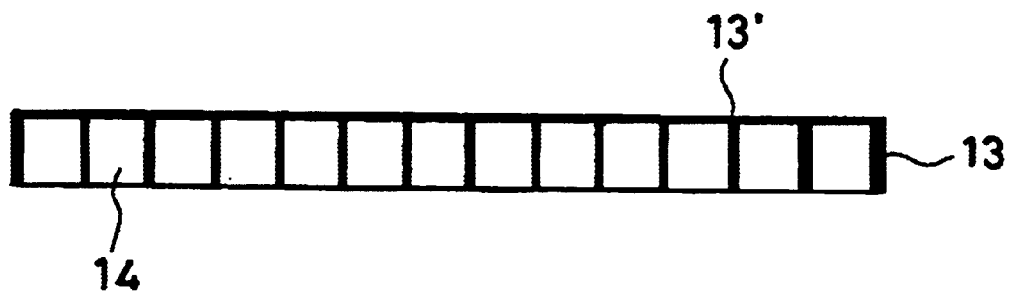
FIGS. 3(a) through 3(c) are plan views showing possible opening patterns of a second electrode of the corona preionization electrode unit according to the present invention.
Figure 3:
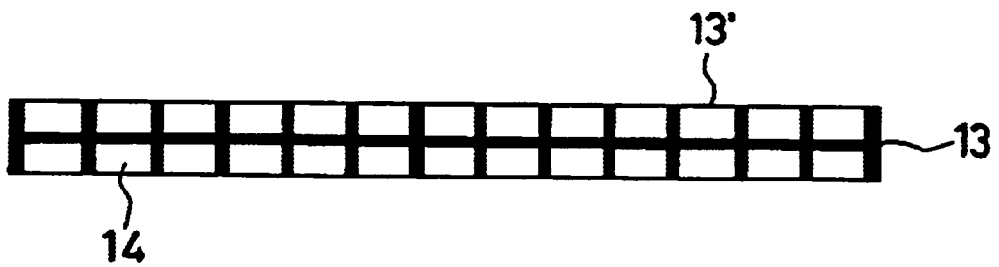
Figure 3:
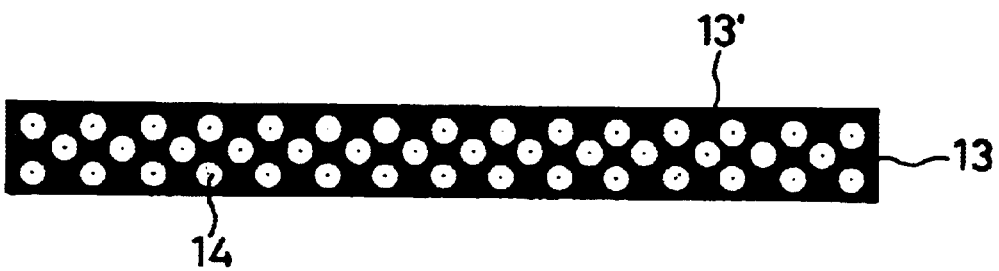

In this embodiment, each corona preionization electrode unit 10 includes a first electrode 11 and a second electrode 13. The first electrode 11 is a circular column-shaped electrode inserted into a tube 12, one end of which is closed. The tube 12 is made of a dielectric material, e.g. high-purity alumina ceramics. The second electrode 13 is a rectangular plate-shaped electrode such as that shown in part (a), (b) or (c) of FIG. 3, which is a top plan view [in the case of FIGS. 1 and 2, a plate-shaped member shown in part (a) of FIG. 3 is used as the second electrode 13]. The plate-shaped member constituting the second electrode 13 is bent in the vicinity of a straight edge 13' thereof. The edge 13' of the second electrode 13 is parallel to and in line contact with the outer surface of the dielectric tube 12. The term "line contact" as used in the present invention does not mean "line contact" in the strict sense in mathematics but includes contact in which the area of contact extends in a narrow belt-like shape. As will be clear from FIG. 1, the second electrode 13 is in line contact with the outer surface of the dielectric tube 12 in such a manner that the surface of the plate-shaped member in the vicinity of the edge 13' of the second electrode 13 is at an angle to a plane tangent to the outer surface of the dielectric material 12 at the position of the line contact. It should be noted that the first electrode 11 may be a circular cylinder-shaped electrode.

As shown in FIG. 3, the second electrode 13 has a plurality of openings 14 provided in a portion of the rectangular plate-shaped member other than at least the edge 13'. In the case of part (a) of FIG. 3, the openings 14 are provided in a one-dimensional lattice pattern. In the case of part (b) of FIG. 3, the openings 14 are provided in a two-dimensional lattice pattern (parallel cross pattern). In the case of part (c) of FIG. 3, the openings 14 are circular openings spaced regularly (polka dot pattern).

The position at which the edge 13' of the second electrode 13 contacts the outer surface of the dielectric tube 12 around the first electrode 11 is set at a position from which the laser excitation space between the main discharge electrodes 3 and 4 is visible.

Thus, the second electrode 13 is in line contact with the outer surface of the dielectric tube 12 around the first electrode 11 only at the edge 13' at the distal end thereof at an angle to a plane tangent to the outer surface of the dielectric tube 12. Therefore, the electric field is concentrated between the first electrode 11 and the edge 13' of the second electrode 13 through the dielectric tube 12. In addition, the electric field distribution becomes uniform in the axial direction. Accordingly, ultraviolet radiation 6 can be generated uniformly and efficiently by corona discharge. Moreover, because the second electrode 13, which is a plate-shaped electrode, is provided with a large number of openings 14, ultraviolet radiation 6 generated by corona discharge on a side of the edge 13' closer to the second electrode 13 is not blocked by the second electrode 13 but can be applied to the laser excitation space between the main discharge electrodes 3 and 4. Because the edge 13' contacts the dielectric tube 12 (i.e. the corona light emission region) at a position from which the laser excitation space is visible, light generated by corona discharge is not blocked. Accordingly, corona preionization can be effected efficiently, stably and uniformly. Because the second electrode 13, which is a plate-shaped electrode, is provided with the openings 14, the laser gas stream 2' is unlikely to be obstructed by the second electrode 13. Consequently, the surface of the dielectric tube 12 can be cleaned of discharge products by the laser gas stream 2' before the subsequent corona discharge is started. Accordingly, there is no possibility of corona discharge becoming unstable, which would otherwise be caused by discharge products remaining on the surface of the dielectric tube 12. In addition, there is no vibration of the second electrode 13 due to resistance to the laser gas stream 2'. Thus, with the corona preionization electrode unit 10 according to the present invention, the electric field for corona discharge is concentrated, and light generated by corona discharge is not blocked, and further the laser gas stream is not obstructed. Therefore, it is possible to effect efficient, stable and uniform corona preionization. Accordingly, even when the laser apparatus performs an oscillating operation at a high pulse repetition frequency, it is possible to effect preionization of high intensity and high uniformity and hence possible to improve the laser output characteristics to a considerable extent.

Figure 4:
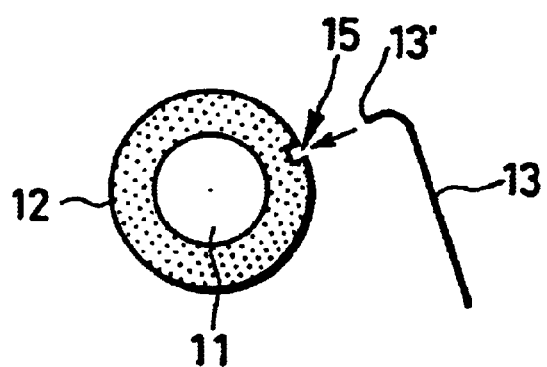
FIG. 4 is a sectional view illustrating a modification in which an edge of the second electrode is inserted into a groove provided in the outer surface of a dielectric tube.

Although in the embodiment of FIG. 1 the outer surface of the dielectric tube 12 around the first electrode 11 is a smooth cylindrical surface, it is preferable to provide a groove in the outer surface of the dielectric tube 12 as shown in FIG. 4. That is, a groove 15 is provided in the outer surface of the dielectric tube 12 at a position where it is in line contact with the edge 13' of the second electrode 13, the groove 15 extending parallel to the axis of the tube 12, and the edge 13' of the second electrode 13 is inserted into the groove 15 to contact the dielectric tube 12. By doing so, the electric field is concentrated between the first electrode 11 and the edge 13' of the second electrode 13 through the dielectric tube 12 even more effectively. Moreover, it becomes more unlikely that the second electrode 13 will be vibrated by the laser gas stream 2'. Consequently, corona discharge becomes more stable.

Figure 5:
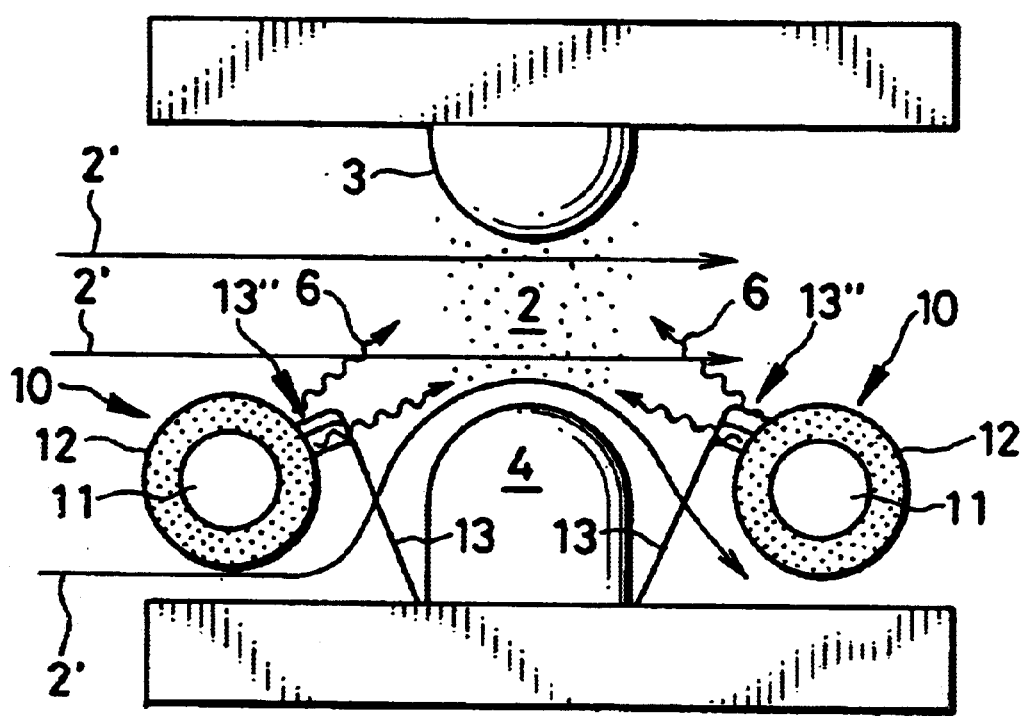
FIG. 5 is a sectional view similar to FIG. 1, showing another embodiment of the present invention.

FIG. 5 is a sectional view similar to FIG. 1, showing another embodiment of the present invention. In this embodiment, the distal end portion of the plate-shaped electrode, which constitutes the second electrode 13, is branched as viewed in the section so that a plurality of edges 13" contact the outer surface of the dielectric tube 12. With this structure, the amount of light generated by corona discharge is increased, and it is possible to further increase the corona preionization intensity.

It should be noted that in the foregoing embodiments the opening ratio of a plurality of openings 14 provided in the plate-shaped electrode as the second electrode 13 is preferably not less than 50%. The higher the opening ratio, the more desirable.

Figure 6:
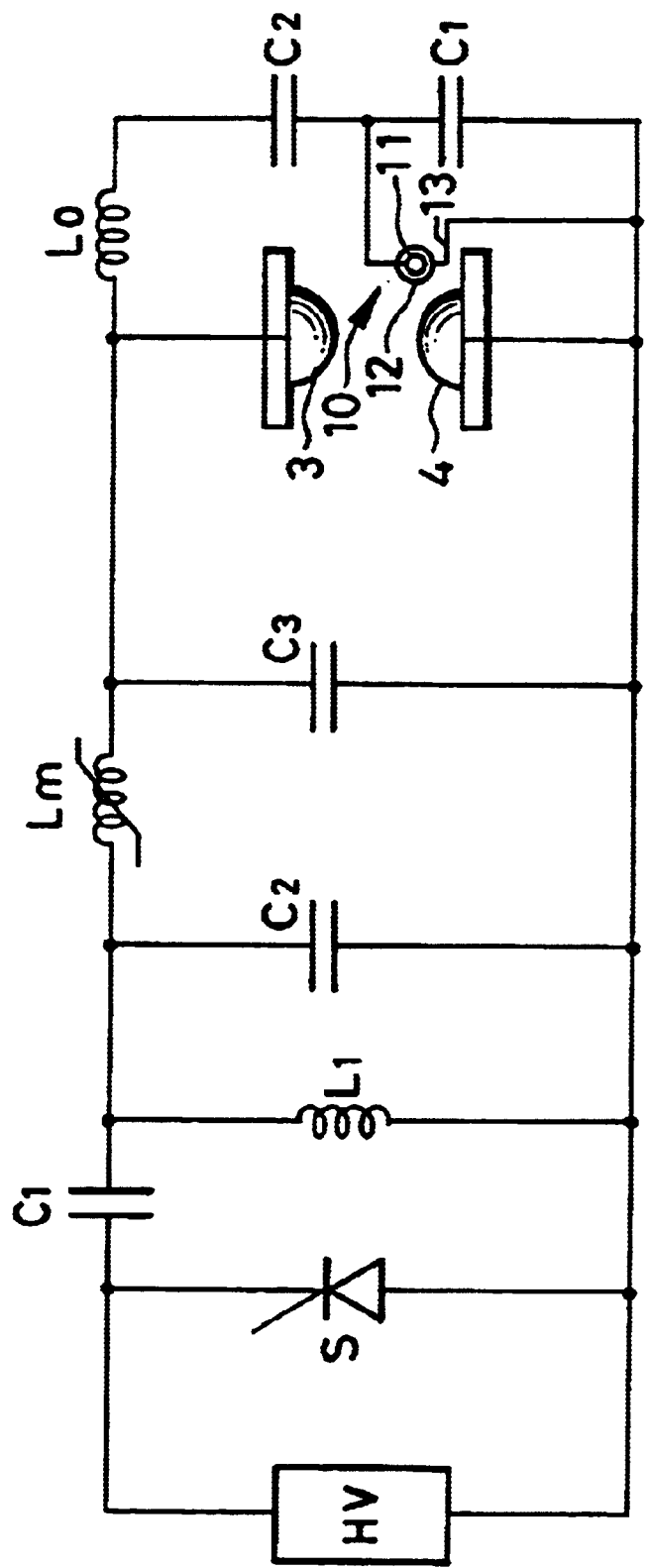
FIG. 6 is a circuit diagram showing an example of an exciting circuit for operating the corona preionization electrode unit according to the present invention synchronously with the discharge operation of the main discharge electrodes.

FIG. 6 is a circuit diagram showing an example of an exciting circuit for operating the corona preionization electrode unit according to the present invention in synchronism with the discharge operation of the main discharge electrodes. The exciting circuit is arranged in a circuit configuration known as "capacitive transfer circuit" using a solid-state switch S such as an IGBT (Insulated Gate Bipolar Transistor). Let us describe the operation of the exciting circuit briefly with reference to the circuit diagram. When the switch S is open, electric charge from a high-voltage power source HV is stored in a capacitor $C_1$. When the switch S is closed in a state where a predetermined amount of charge has been stored in the capacitor $C_1$, the charge in the capacitor $C_1$ is transferred to a capacitor $C_2$. The charge transferred to the capacitor $C_2$ is transferred to a capacitor $C_3$ through a nonlinear inductance $L_m$ known as "magnetic switch" or "supersaturation inductance". At this time, the pulse width of the applied voltage is compressed by the action of the magnetic switch $L_m$. It should be noted that the action of the magnetic switch $L_m$ is as follows. While the charge in the capacitor $C_1$ is being transferred to the capacitor $C_2$, the magnetic switch $L_m$ provides a large inductance. When the magnetic flux density becomes saturated, the inductance of the magnetic switch $L_m$ decreases rapidly. Accordingly, the magnetic switch $L_m$ allows the charge in the capacitor $C_2$ to be efficiently transferred to the capacitor $C_3$. When the voltage across the capacitor $C_3$ becomes sufficiently high to reach the discharge breakdown voltage, a pulse discharge takes place between the main discharge electrodes 3 and 4, and thus the laser gas 2 is excited. A voltage divider circuit including capacitors $C_{11}$ and $C_{12}$ and an inductance $L_0$ is connected in parallel to the main discharge electrodes 3 and 4 to divide the pulse voltage applied between the main discharge electrodes 3 and 4 and to obtain a fraction of the applied voltage in the range of 25% to 75% of the total voltage. In this way, the voltage divider circuit applies the voltage for corona discharge between the first and second electrodes 11 and 13 of the corona preionization electrode unit. The time constant is set to a desired value by optimally selecting the voltage dividing ratio in the voltage divider circuit, the capacities of the capacitors $C_{11}$ and $C_{12}$ and the value of the inductance $L_0$, thereby adjusting the corona predischarge timing with respect to the main electric discharge. The combined capacity of the voltage divider circuit is adjusted to not more than 10% of the capacity of the peaking capacitor $C_3$. The voltage divider circuit is known in Japanese Patent Application Unexamined Publication (KOKAI) No. 1-276783.

Although the corona preionization electrode unit for gas laser apparatus according to the present invention has been described above by way of embodiments, it should be noted that the present invention is not limited to the foregoing embodiments but can be modified in a variety of ways.

As will be clear from the foregoing description, in the corona preionization electrode unit for gas laser apparatus according to the present invention, the second electrode is a plate-shaped member having a straight edge contacting at least the outer surface of the dielectric material around the first electrode, and a portion of the plate-shaped member other than the edge is provided with a plurality of openings for passage of ultraviolet light for preionization and a circulating laser gas. Therefore, the electric field for corona discharge is concentrated, and light generated by corona discharge is not blocked, and further the laser gas stream is not obstructed, thereby allowing efficient, stable and uniform corona preionization. Accordingly, even when the laser apparatus performs an oscillating operation at a high pulse repetition frequency, it is possible to effect preionization of high and high uniformity and hence possible to improve the laser output characteristics to a considerable extent.

What we claim is:

1. A preionization electrode unit disposed in a gas laser apparatus together with a pair of main discharge electrodes for ionizing and exciting a laser gas, said corona preionization electrode unit including a first electrode covered with a dielectric material and a second electrode placed in contact with an outer surface of the dielectric material around the first electrode, said corona preionization electrode unit being positioned in the vicinity of either one of the main discharge electrodes, the improvement wherein said second electrode is a plate shaped member having a straight edge contacting at least the outer surface of said dielectric material, and a portion of the plate shaped member other than said edge is provided with a plurality of openings for passage of ultraviolet light for preionization and a circulating laser gas.

2. A corona preionization electrode unit according to claim 1, wherein said second electrode is in narrow belt-like shape contact with the cuter surface of said dielectric material at said edge, and a surface of the plate shaped member in the vicinity of said edge of said second electrode is inclined at a substantially non-zero angle to a plane tangent to the outer surface of said dielectric material at the position of the line contact.

3. A corona preionization electrode unit according to claim 1, wherein said edge of said second electrode contacts the outer surface of said dielectric material at a position from which a space between said main discharge electrodes is visible.

4. A corona preionization electrode unit according to claim 1, wherein said second electrode is bent or curved in the vicinity of said edge.

5. A corona preionization electrode unit according to claim 1, wherein said second electrode is in contact with a plurality of portions of the outer surface of said dielectric material at portions thereof in the vicinity of said edge.

6. A corona preionization electrode unit according to claim 1, wherein an opening ratio of said openings in said second electrode is not less than 50%.

7. In a corona preionization electrode unit disposed in a gas laser apparatus together with a pair of main discharge electrodes for ionizing and exciting a laser gas, said corona preionization electrode unit including a first electrode covered with a dielectric material and a second electrode placed in contact with an outer surface of the dielectric material around the first electrode, said corona preionization electrode unit being positioned in the vicinity of either one of the main discharge electrodes, the improvement wherein said second electrode is a plate shaped member having a straight edge contacting at least the outer surface of said dielectric material, and a portion of the plate shaped member other than said edge is provided with a plurality of openings for passage of ultraviolet light for preionization and a circulating laser gas, wherein said edge of said second electrode is inserted into a groove formed in the outer surface of said dielectric material to contact said dielectric material.

8. A corona preionization electrode unit according to claim 7, wherein said second electrode is bent or curved in the vicinity of said edge.

9. A corona preionization electrode unit according to claim 7, wherein said second electrode is in contact with a plurality of portions of the outer surface of said dielectric material at portions thereof in the vicinity of said edge.

10. A corona preionization electrode unit according to claim 7, wherein an opening ratio of said openings in said second electrode is not less than 50%.

* * * * *